United States Patent [19]
Danroc et al.

[11] Patent Number: 6,159,618
[45] Date of Patent: Dec. 12, 2000

[54] MULTI-LAYER MATERIAL WITH AN ANTI-EROSION, ANTI-ABRASION, AND ANTI-WEAR COATING ON A SUBSTRATE MADE OF ALUMINUM, MAGNESIUM OR THEIR ALLOYS

[75] Inventors: Joël Danroc; Pierre Juliet, both of Grenoble; André Rouzaud, Seyssinet, all of France

[73] Assignee: Commissariat a l'Energie Atomique, Paris, France

[21] Appl. No.: 09/087,760

[22] Filed: May 29, 1998

[30] Foreign Application Priority Data

Jun. 10, 1997 [FR] France .................................. 97 07171

[51] Int. Cl.[7] .............................. B32B 9/00; B32B 15/00; C25D 11/02
[52] U.S. Cl. ........................ 428/610; 428/627; 428/629; 428/651; 428/472; 428/472.2
[58] Field of Search .................................. 428/472, 472.1, 428/472.2, 610, 627, 629, 634, 635, 651, 665; 148/237, 238, 420, 437, 440

[56] References Cited

U.S. PATENT DOCUMENTS

| | | | |
|---|---|---|---|
| 4,761,346 | 8/1988 | Naik ....................................... | 428/627 |
| 4,855,188 | 8/1989 | Garg et al. .............................. | 428/627 |
| 5,547,767 | 8/1996 | Paidassi et al. ......................... | 428/610 |
| 5,702,829 | 12/1997 | Paidassi et al. ......................... | 428/610 |

FOREIGN PATENT DOCUMENTS

| | | | |
|---|---|---|---|
| 0 018 432 | 11/1980 | European Pat. Off. ........ | C23C 11/08 |
| 0 328 084 | 8/1989 | European Pat. Off. ........ | C23C 28/00 |
| 0 339 153 | 11/1989 | European Pat. Off. .......... | C23C 4/02 |
| 0 411 646 | 2/1991 | European Pat. Off. ........ | C23C 28/00 |
| 0 674 020 | 9/1995 | European Pat. Off. ........ | C23C 28/00 |
| 2 682 400 | 4/1993 | France ........................... | C23C 28/00 |
| 2 693 477 | 1/1994 | France ........................... | C23C 28/02 |
| 581357 | 10/1946 | United Kingdom . | |

*Primary Examiner*—Deborah Jones
*Assistant Examiner*—Bryant Young
*Attorney, Agent, or Firm*—Pearne & Gordon LLP

[57] ABSTRACT

This invention relates to a multi-layer material that comprises a substrate made of aluminum, magnesium or their alloys, having possibly been subjected to a surface treatment, this substrate being provided with a coating comprising a tungsten based deposit and an under-layer—inserted between said substrate and said deposit—of a material having mechanical and thermo-mechanical properties intermediate to those of said substrate and said deposit. This under-layer is made up of at least one layer of a material chosen from among chromium, molybdenum, niobium, titanium, zirconium, their nitrides and carbides, solid solutions of carbon and of nitrogen in said metals, and steels and greatly improves the adherence of said coating to said substrate.

The invention also relates to the anti-erosion, anti-abrasion, anti-wear coating comprising said tungsten based deposit and said under-layer.

14 Claims, No Drawings

MULTI-LAYER MATERIAL WITH AN ANTI-EROSION, ANTI-ABRASION, AND ANTI-WEAR COATING ON A SUBSTRATE MADE OF ALUMINUM, MAGNESIUM OR THEIR ALLOYS

DESCRIPTION

This invention relates to a multi-layer material with an anti-erosion, anti-abrasion and anti-wear coating on a substrate made of aluminum, magnesium or their alloys.

More precisely, this invention relates to a multi-layer material that comprises a substrate made of aluminum, magnesium or their alloys, having possibly been subjected to a surface treatment, this substrate being provided with a coating comprising a tungsten based deposit and an under-layer—inserted between said substrate and said deposit—of a material having mechanical and thermo-mechanical properties intermediate to those of said substrate and said deposit.

The invention also relates to the anti-erosion, anti-abrasion, anti-wear coating comprising said tungsten based deposit and said under-layer.

The technological field of the invention can be defined as being that of the anti-erosion, anti-abrasion and anti-wear protection of materials.

The erosion of materials constituting mechanical components subjected to the impact of abrasive particles such as sand or dusts of solid hard materials, is a well-known industrial problem in numerous fields, notably in aeronautical engineering, where because improved performance is being sought, the lightest possible substrates are used.

The components subjected to such conditions are for example the propellers, rotors and compressor blades of aircraft engines in which wear through erosion of the leading edges of the blades causes a degradation in engine performance.

The same type of problem is also met in all technological sectors where components, such as aluminum or alloy components, whether fixed or moving, are liable to receive a bombardment by hard particles. This is notably the case for turbine blades of electrical power stations and in the construction and building industries etc.

The protection of materials against wear and/or scaling is an analogous problem which one meets particularly with light alloy components such as pulley block type components.

The rate of erosion of materials is defined as the mass of material stripped away for a given mass of incident particles. This rate of erosion varies with the angle of incidence of the solid particles which strike the surface of the material concerned.

The mechanisms of erosion have been studied by various authors and notably by J. P. Massoud in his work: "Comportement à l'érosion par des particules solides d'un alliage de titane TA6V traité par laser" ("Behaviour of TA6V titanium alloy treated by laser to erosion by solid particles") Doctorate Thesis Materials' Engineering INSA in Lyon (1988). This research allowed one to distinguish essentially two types of behaviour of materials subjected to erosion:

- a behaviour characteristic of ductile materials such as metals, whose rate of erosion is low with a jet of solid particles with perpendicular incidence (in relation to the plane of material);
- a behaviour characteristic of brittle materials such as glass, ceramics and hard materials such as the carbides, whose rate of erosion is low with a jet of particles with oblique incidence.

Furthermore, complementary studies carried out by T. Foley and A. Levy, in their article, "The Effect of Heat Treatment on the Erosion Behaviour of Steel", Proceedings of the Conference on Wear of Materials, Reston, Va., Apr. 11–14, 1983, ASME, 1983, p. 346, have shown that the micro-structure of the material also plays an important role. For example, the rate of erosion of steels in different micro-structural states —for example XC75 steel in a coarse perlite, fine perlite form or a globulised structure or XC20 steel in its three globulised forms—is directly linked to the distribution of the hard, brittle and ductile phases in the alloy, whereas the hardness of these steels varies little with the state of the micro-structure.

In addition, the erosion also varies as a function of the shape, the size and the distribution of the precipitates covering a substrate. G. Hickey, D. Boone, A. Levy and J. Stiglich, in their article "Erosion of Conventional and Ultrafine-Grained Materials", Thin Solid Films, 118, 321 (1984), have shown that fine precipitates of SiC on the steel have a better resistance to erosion than a coarse precipitation.

Finally, the rate of erosion depends on a certain number of parameters linked to the nature of the eroding material such as the size and the shape of the eroding particles, their hardness, and their brittleness, as well as the test conditions, represented notably by the speed of the particles and by their angle of incidence.

Consequently, it emerges from the studies previously mentioned that the parameters that can intervene in the erosion phenomena and influence them are numerous, that it is sometimes difficult to properly compare the behaviour of different materials and that making fine adjustments to an anti-erosion, anti-abrasion and anti-wear coating is extremely chancy.

Nevertheless, so as to respond to these erosion, abrasion and wear problems, certain materials have already been proposed.

This is the reason why such diverse materials as alloys of refractory metals, carbides, nitrides and borides for example, have been studied and used as anti-erosion, anti-abrasion and anti-wear coatings. These materials have been deposited, for example, on the compressor blades of aircraft, by various techniques such as plasma projection, the CVD (Chemical Vapour phase Deposition) process, the transferred arc process, cathodic sputtering method and other techniques of physical or chemical deposition.

Numerous anti-erosion, anti-abrasion and anti-wear coating are based on tungsten since the mechanical properties of this metal, and notably its high Vickers hardness associated with a high modulus of elasticity, make it particularly suitable for such use.

Hence, document EP-A-0 411 646 describes a multi-layer anti-erosion and anti-abrasion coating comprising a layer of tungsten and a second layer of a mixture of tungsten and tungsten carbide.

Similarly, document EP-A-0 328 084 relates to an anti-erosion and anti-abrasion coating in which a layer of tungsten then a layer of a mixture of tungsten and tungsten carbide are deposited onto a substrate.

Document FR-A-2 682 400 relates to a multi-layer anti-erosion and anti-abrasion coating made up of at least one ductile layer of tungsten metal and at least one hard layer of a solid solution of carbon, the two types of layers being alternated.

The substrate covered by this multi-layer coating is chosen, for example, from among a titanium alloy, an oxidizable steel, an aluminum alloy, polymers and composite materials.

However, it turns out that in the case of the substrates made of aluminum, magnesium and magnesium and aluminum alloys, which have possibly been subjected to a surface treatment such as anodizing, the adherence of the coatings described in this document was notably inadequate, particularly in the event of severe loading.

Document FR-A-2 693 477 relates to a multi-layer coating for the protection of surfaces against erosion and abrasion which comprises, layers of tungsten or an alloy of tungsten, and layers of a solid solution of tungsten and nitrogen deposited alternately onto a substrate.

The nature of the substrate has not been made clear; in the examples, steel or titanium alloy substrates are used and the specific problem of the adherence of the anti-erosion, anti-abrasion, anti-wear coatings on substrates made of aluminum, magnesium or their alloys, is not mentioned.

Document EP-A-0 018 432 describes metal components provided with an anti-wear and anti-corrosion coating, in particular made of tungsten carbide.

These metal components are, in particular clock-making components such as casings and watch bracelets and jewels.

In general, between the protective layer and the metal part (steel, copper, aluminum and alloys) of such components, an intermediate layer called the adhesion layer is provided.

According to this document, a component made of aluminum, copper or one of their alloys, with low hardness and a high coefficient of thermal expansion, is thereby provided with an intermediate layer with a minimum thickness of 20 $\mu$m which has a hardness greater than that of the metal part, but less than that of tungsten carbide and a coefficient of thermal expansion less than that of the metal part but greater than that of tungsten carbide. The intermediate layer can be constituted by Ni, Co, NiP, CoP, NiB, CoB, Cu, Fe, NiSn, NiFe or CuSn.

Because of the relatively great thickness of the intermediate layer, the transition between the properties of the tungsten carbide and those of the metal occurs in a progressive manner which permits, in particular, better adherence.

In this document, the intermediate layer has therefore an increased thickness, that has to be greater than 20 $\mu$m, since, if it is not the progressive transition between the properties of the substrate and of the tungsten based deposit cannot be provided. Furthermore, the specific problems posed by substrates made of aluminum or magnesium are not mentioned.

Hence there exists a need for a multi-layer material comprising a substrate and an anti-erosion, anti-abrasion, anti-wear coating that, in particular, does not show any problems of adherence of the coating onto substrates made of aluminum, magnesium or their alloys.

To put it in other terms, there exists a need, at present unsatisfied, for a multi-layer material comprising a substrate made of aluminum, magnesium or their alloys and a coating comprising a tungsten based deposit that has excellent adherence to said substrate.

Said improvement in adherence must, on the other hand, be brought about without the properties of resistance to erosion, to wear and to abrasion being affected. Finally, it would be desirable that such a coating be deposited using standard proven deposition methods.

An objective of the invention is therefore to provide a multi-layer material comprising a substrate made of aluminum, magnesium or one of their alloys and an anti-erosion, anti-abrasion and anti-wear coating comprising a tungsten based deposit which satisfies, among other things the set of needs and criteria mentioned above, which gets rid of the disadvantages and difficulties met with the multi-layer materials of the prior art and which resolves the problems brought to the fore in the prior art.

This objective, and others are achieved according to the invention by a multi-layer material comprising a substrate made of aluminum, magnesium or one of their alloys, and an anti-erosion, anti-abrasion, and anti-wear coating, comprising a tungsten based deposit, said coating comprising, in addition, an under-layer of a material that has mechanical and thermo-mechanical properties intermediate between those of said substrate and said deposit, said under-layer being inserted between said substrate and said tungsten based deposit, characterized in that said under-layer is made up of at least one layer of a material chosen from among chromium, molybdenum, niobium, titanium, zirconium, their nitrides and carbides, solid solutions of carbon and of nitrogen in said metals, and steels.

Because of the high reactivity of the under-layer of the multi-layer material according to the invention, the chemical bond between the tungsten based deposit and the substrate is greatly strengthened. Hence the adherence is much improved.

The under-layer according to the invention has mechanical and thermo-mechanical properties intermediate between those of the substrate and those of the deposit.

By intermediate thermo-mechanical properties, one understands, generally that this under-layer has, for example, a coefficient of thermal expansion intermediate between that of the substrate and that of the tungsten based deposit and because of this the loading on the substrate-coating interface at the time of temperature variations is reduced and distributed and the heat resistance of the assembly is hence very much better particularly when it is subjected to thermal cycling.

Furthermore, the temperature increases that arise during manufacturing processes have, thanks to the presence of the under-layer according to the invention, residual effects that are much less important.

By intermediate mechanical properties, one understands generally that the under-layer has, for example, a hardness (a "Vickers" hardness) intermediate between that of the substrate and that of the tungsten based deposit. The intermediate hardness provided by the under-layer allows a more gradual passage from the substrate for example made of aluminum, to the tungsten. The resistance of the assembly under heavy loading, that is to say under heavy exposure to wear, abrasion and erosion factors is found to improve.

It should be noted that the effects, advantages and improvements provided by the invention are only for the specific materials indicated above, the implementation of which has neither been described nor suggested by the prior art; in particular by document EP-A-0 018 432.

It has been brought to the fore according to the invention that only the specific materials quoted above constitute the under-layer and allow in a surprising manner the achievement of the objectives mentioned above in the particular case of substrates made of magnesium, aluminum or one of their alloys.

Conforming to the invention, the substrate is, in effect, generally a substrate made of aluminum, magnesium or one of their alloys.

The substrate can also have been subjected to a surface treatment which modifies the properties of it, for example, anodizing.

A preferred material for the substrate of the multi-layer material according to the invention is, for example, aluminum or an anodized alloy of aluminum.

The under-layer according to the invention, can comprise a single layer or a stack of several layers, that is to say 2 to 4 layers.

The under-layer according to the invention may only comprise a single layer formed from one of the materials quoted above but it may however also comprise a stack of several of these layers, namely 2 to 4 layers.

Each layer, alone, or forming part of a stack has, for example, a thickness of from 0.01 to 10 μm, preferably from 0.5 to 5 μm and for example of 1 μm.

It should be noted and it is also one of the unexpected advantages and effects of the invention that it is surprising that the objectives mentioned above are achieved with a thickness that is so small since in the prior art, it is absolutely essential that the under-layer has a thickness of at least 20 μm.

This notable reduction in the thickness of the under-layer is linked to the choice of a specific material for the under-layer and cannot be provided with the materials of the prior art.

Hence the under-layer according to the invention can be composed of a single layer of a material chosen from among the materials quoted above such as chromium, molybdenum, niobium, titanium, zirconium and the steels. Among the steels, the stainless steels such as the 18 Cr/10 Ni type steels will be preferred.

Such a single metal layer, produced in a specific material according to the invention, of a thickness, for example of from 0.01 to 10 μm, in particular 1 μm, has a coefficient of expansion between that of the substrate made of magnesium, aluminum or an alloy of magnesium or of aluminum and that of the tungsten that forms the base of the deposit.

The under-layer according to the invention can also be made up of a stack of several layers of a metallic material mentioned above. Such a stack generally comprises from 2 to 4 layers, preferably from 2 to 4 layers, for example 3 layers. Each layer in the stack forming the under-layer has a thickness analogous to that of a single layer mentioned above, namely, for example 0.01 to 10 μm.

Any number, order, nature and succession of layers can be used but the stack of several layers forming the under-layer is preferably arranged in accordance with an arrangement that allows the transition of thermo-mechanical and mechanical properties to be provided between on the one hand the substrate and on the other hand the tungsten based deposit.

The under-layer according to the invention can also only comprise a single layer of a material chosen from among the carbides and nitrides of chromium, molybdenum, niobium, titanium, zirconium and solid solutions of carbon or nitrogen in them.

The under-layer according to the invention can also be composed of a stack comprising a first metallic layer of Cr, Mo, Nb, Zr, or Ti, and a second layer of nitride or carbide of the same metal as said first metallic layer, or of a solid solution of nitrogen or carbon in the same metal as said first metallic layer.

The transition between said first layer and second layer can be provided either in a straightforward fashion, that is to say that one simply has a two layer type stack, or in a progressive fashion by means of a layer which provides a composition gradient and is placed between said first layer and said second layer.

The under-layer according to the invention can moreover be made up of a single layer of aluminum nitride and magnesium nitride, the thickness of which is, for example from 0.01 to 10 μm, as has already been mentioned.

Furthermore, the under-layer according to the invention can be constituted by a single layer of aluminum-tungsten with a composition gradient in which one passes progressively from pure aluminum—in the vicinity of the substrate—to pure tungsten—in the vicinity of the deposit.

Finally, the under-layer according to the invention can also be constituted by a single layer of aluminum oxide.

The invention also relates to an anti-erosion, anti-abrasion and anti-wear coating, for a substrate made of aluminum, magnesium or one of their alloys, comprising a tungsten based deposit, said coating comprising in addition an under-layer of a material having mechanical and thermo-mechanical properties intermediate between those of said substrate and those of said deposit, characterized in that said under-layer is made up of at least one layer of a material chosen from among chromium, molybdenum, niobium, titanium, zirconium, their nitrides and carbides, solid solutions of carbon and of nitrogen in said metals and steels.

The under-layer of this coating is as specified above, while the tungsten based deposit is as specified in what follows.

The invention will be better understood by reading the following description of an embodiment of the invention given by way of an illustrative example and being non-limitative.

As has already been indicated above, the multi-layer material according to the invention comprises a substrate made of aluminum, magnesium or one of their alloys. It is however obvious that any composite material comprising a large proportion of aluminum or magnesium with another material could also come within the scope of the substrate according to the invention.

Onto this substrate, an anti-erosion, anti-abrasion and anti-wear coating is deposited that includes first of all an under-layer according to the invention and then a tungsten based deposit.

The thickness of the under-layer is generally from 0.01 to 10 μm, preferably from 0.5 to 5 μm, when it is constituted by a single layer, and generally from 1 to 10 μm when it is formed by a stack comprising several layers. It may be seen therefore that according to the invention, the thickness of the under-layer is significantly reduced in comparison with the prior art, in particular in comparison with document EP-A-0 018 432 and that better adherence is obtained.

Such a reduction in thickness while improving the properties of the coating and, in particular its adherence is essentially due to the choice of specific materials for the under-layer according to the invention.

The tungsten based deposit can be any tungsten based deposit that is suitable for giving the desired anti-erosion, anti-abrasion and anti-wear properties.

Said tungsten based deposit will therefore include at least one layer made of a material chosen for example from among tungsten, the carbides, suicides and nitrides of tungsten, tungsten alloys and their mixtures and solid solutions of nitrogen and of carbon in tungsten.

The tungsten based deposit can comprise a single one of these layers or a stack of several of these layers, that is to say, for example, from 2 to 24 layers.

The total thickness of the tungsten based deposit is generally from 5 to 60 μm.

The thickness of the layer or of each layer of the deposit is preferably from 1 to 10 μm.

The total thickness of the coating (deposit and under-layer) is generally from 5 to 70 μm.

Such a stack can, for example, like the one described in document FR-A-2 682 400 already mentioned, include at least one layer—a ductile layer—of metallic tungsten and at least one layer—a hard layer—of a solid solution of carbon in tungsten. This alternance of layers can be repeated, that is to say the tungsten based deposit can comprise a stack of from 2 up to 20 of these two layer structures.

The tungsten based deposit can also, as is the case in document FR-A-2 693 477 comprise alternately at least one layer of tungsten or tungsten alloy and at least one layer of solid solution of tungsten and nitrogen.

To prepare the multi-layer material according to the invention, preferably one starts with a substrate polished with diamond paste.

Then the deposition of the layer or layers making up the under-layer according to the invention is carried out. The layer or each of the layers forming the under-layer can be prepared by a standard method of deposition known to a man skilled in this field of technology. Similarly, the operating conditions and the parameters governing these deposition methods can be easily determined by a man skilled in the art and will not be described in further detail.

Hence, for example, in the case of the deposition of a single layer of a metal such as chromium, molybdenum, niobium, zirconium, titanium etc . . . it is preferable to deposit this layer by the same method as that which is generally used to carry out the deposition of the tungsten based deposit, that is to say by cathodic sputtering, but it is also possible to carry out this deposition by any other type of method such as evaporation, Chemical Vapour Deposition (CVD), Plasma Assisted Chemical Vapour Deposition (PACVD) Metal Organic Chemical Vapour Deposition (MOCVD) or by chemical or electrochemical deposition methods.

In the case of an under-layer formed by a stack of layers, each layer can be deposited by the same method or by different methods.

Hence, if one wishes to carry out the deposition of several metallic layers produced in an arrangement that provides the transition in mechanical and thermo-mechanical properties, for example, by beginning with the deposition of a layer of titanium, then continuing with a layer of chromium and then a layer of molybdenum before proceeding with the deposition of the tungsten itself, such an arrangement can be obtained by sputtering but also by any other suitable method group such as evaporation under vacuum.

For an under-layer made up of aluminum nitride or magnesium nitride, this layer can be obtained either by a physical or a chemical deposition method, or by a diffusion treatment (nitriding, assisted or not by a plasma).

Onto the substrate provided with the under-layer according to the invention, one then deposits the tungsten based deposit, this deposition being carried out in the standard manner by a known method or group of methods. Preferably, as indicated above, this deposition is carried out by cathodic sputtering.

It should be noted that one of the unexpected effects and advantages provided by the presence in the multi-layer material according to the invention of an under-layer, is that the influence of temperature increases during the manufacturing processes is substantially less harmful than in the prior art materials which are without an under-layer.

The following examples given for illustrative purposes and being non-limitative, illustrate the preparation and the properties of multi-layer materials according to the invention.

EXAMPLES

Example 1

This example illustrates the improvement in adherence onto an anodised aluminum substrate of a coating according to the invention that includes an under-layer of titanium.

Example 1A

Depositions of tungsten 10 $\mu$m thick are carried out by cathodic sputtering onto an anodized aluminum substrate. A scratch test using an instrument permits the measurement of a critical load which is proportional to the adherence of the deposit.

In this case, conforming to the prior art, where one notes the absence of an under-layer, that is to say the tungsten is directly in contact with the anodised aluminum, the measured mean value of the critical load is 5 N.

Example 1B

In a manner analogous to Example 1A, 10 $\mu$m depositions of tungsten are carried out by cathodic sputtering, with the difference that the anodized aluminum substrate is, conforming to the invention, previously covered by a 1 $\mu$m layer of titanium also deposited by sputtering.

In the same way as for Example 1A, the critical load, which is proportional to the adherence of the deposit is measured.

In this case, where an under-layer is present conforming to the invention, the mean measured value for the critical load is 12 N or more than two times greater than that for Example 1A.

Example 2

This example illustrates the improvement in the resistance to thermal cycling, obtained with a multi-layer material according to the invention that includes an under-layer.

Example 2A

W/W(C) multi-layer depositions (that is to say depositions comprising at least one layer of metallic tungsten and at least one layer of a solid solution of carbon in tungsten) of 50 $\mu$m are carried out by cathodic sputtering onto an anodized aluminium substrate.

The test pieces were then tested on a thermal cycling bench operating between 100° C. and 400° C.

These test pieces, conforming to the prior art, produced without an under-layer, showed damage at the end of 50 cycles.

Example 2B

In a manner analogous to Example 2A W/W(C) multi-layer depositions of 50 $\mu$m thickness are carried out by cathodic sputtering, with the difference that the anodized aluminum substrate had been, conforming to the invention, previously covered with a 1 $\mu$m layer of titanium and a 1 $\mu$m layer of molybdenum was also deposited by sputtering.

The test pieces prepared in this way are then tested in the same way as in Example 2A.

These test pieces, produced conforming to the invention with under-layers, only showed observable traces of damage at the end of 200 cycles.

Example 3

This example illustrates the improvement in the resistance -to stress, provided with a multi-layer material according to the invention that includes an under-layer of aluminum nitride.

Example 3A

W/W(C) multi-layer depositions of 50 μm are carried out by cathodic sputtering onto an anodized aluminum substrate.

The test pieces are then assessed on an erosion bench.

Example 3B

In a manner analogous to Example 3B W/W(C) multi-layer depositions of 50 μm thickness are carried out by cathodic sputtering, with the difference that the anodized aluminum substrate had been, conforming to the invention, previously treated by ionic nitriding in such a way that it is thereby provided with an under-layer according to the invention constituted by aluminum nitride.

The test pieces thus prepared are then assessed on an erosion bench in the same way as in Example 3A.

For the same number of eroding particles, the loss of mass of the test pieces according to the prior art (Example 3A) which were not subjected to the nitriding pre-treatment, is five times greater than that of the test pieces according to the invention (Example 3B) that had been previously nitrided, that is to say those that include an under-layer of aluminum nitride.

What is claimed is:

1. Multi-layer material comprising a substrate and an anti-erosion, anti-abrasion, and anti-wear coating including a tungsten deposit and an under-layer between said deposit and said substrate, said substrate being formed of aluminum, magnesium or one of their alloys, said tungsten deposit including at least one layer of a material selected from the group consisting of tungsten, alloys of tungsten, the carbides, silicides and nitrides of tungsten, and their mixtures and the solid solutions of nitrogen and of carbon in tungsten, said under-layer being formed of a material having mechanical and thermo-mechanical properties intermediate to those of said substrate and those of said deposit, said under-layer including at least one layer of a material selected from the group consisting of aluminum, chromium, molybdenum, niobium, titanium, zirconium, their nitrides and carbides, solid solutions of carbon and nitrogen in said metals, steels, aluminum-tungsten with a composition gradient and aluminum oxide.

2. Multi-layer material according to claim 1, wherein said substrate has been subjected to a surface treatment.

3. Multi-layer material according to claim 2, wherein said substrate is aluminum or an anodized alloy of aluminum.

4. Multi-layer material according to claim 1, wherein said under-layer is made up of a stack of several layers.

5. Multi-layer material according to claim 1, wherein said under-layer is made up of a stack of several metallic layers formed of Cr, Mo, Nb, Zr, Ti or steel.

6. Multi-layer material according to claim 4, wherein said under-layer is made up of a stack comprising a first metallic layer of Cr, Mo, Nb, Zr, or Ti, and a second layer of a nitride or carbide of the same metal as the first metallic layer, or a solid solution of nitrogen or of carbon in the same metal as said first metallic layer.

7. Multi-layer material according to claim 6, wherein said stack includes, in addition, a layer with a composition gradient that provides a progressive transition between said first layer and said second layer of said stack.

8. Multi-layer material according to claim 1, wherein said under-layer is made up of a layer of aluminum nitride or magnesium nitride.

9. Multi-layer material according to claim 1, wherein said under-layer is formed of a single aluminum-tungsten layer with a composition gradient progressively varying from pure aluminum to pure tungsten.

10. Multi-layer material according to claim 1, wherein said under-layer is made up of a single layer of aluminum oxide.

11. Multi-layer material according to claim 10, wherein said single layer of aluminum oxide has a thickness of from 0.01 to 10 μm.

12. Multi-layer material according to claim 1, wherein said tungsten based deposit has a thickness of from 5 to 60 μm.

13. Multi-layer material according to claim 1, wherein the total thickness of said coating is from 5 to 70 μm.

14. Anti-erosion, anti-abrasion, and anti-wear coating, for a substrate made of aluminum, magnesium, or one of their alloys comprising a tungsten deposit, said deposit comprising at least one layer of a material selected form the group consisting of tungsten, alloys of tungsten, the carbides, suicides and nitrides of tungsten, and their mixtures and the solid solutions of nitrogen and of carbon in tungsten, said coating comprising in addition an under-layer of a material having mechanical and thermo-mechanical properties intermediate to those of said substrate and those of said deposit, said under-layer being made up of at least one layer of a material selected from the group consisting of chromium, molybdenum, niobium, titanium, zirconium, their nitrides and carbides, solid solutions of carbon and nitrogen in said metals, steels, aluminum-tungsten with a composition gradient and aluminum oxide.

* * * * *